US007852396B2

(12) United States Patent
Narukawa et al.

(10) Patent No.: US 7,852,396 B2
(45) Date of Patent: Dec. 14, 2010

(54) IMAGE PICK-UP APPARATUS WITH EXPOSURE SETTING METHOD (75) Inventors: Yoshitaka Narukawa, Saitama (JP); Michitomo Koda, Tokyo (JP); Noriaki Nakagawa, Tokyo (JP)

(73) Assignee: Sony Corporation (JP)

( * ) Notice: Subject to any disclaimer, the term of this patent is extended or adjusted under 35 U.S.C. 154(b) by 853 days.

(21) Appl. No.: 11/713,549

(22) Filed: Mar. 1, 2007

(65) Prior Publication Data
US 2007/0216958 A1   Sep. 20, 2007

(30) Foreign Application Priority Data
Mar. 3, 2006   (JP) ............................. P2006-057268

(51) Int. Cl.
*H04N 5/222* (2006.01)
(52) U.S. Cl. .............................. 348/333.02; 348/333.05
(58) Field of Classification Search .............. 348/223.1, 348/229.1, 230.1, 333.01, 333.05, 362–368
See application file for complete search history.

(56) References Cited
U.S. PATENT DOCUMENTS
2003/0063213 A1* 4/2003 Poplin ........................ 348/362

2004/0042791 A1* 3/2004 Suekane et al. ............. 396/661
2005/0185055 A1* 8/2005 Miller et al. ............. 348/207.1

FOREIGN PATENT DOCUMENTS

| JP | 2001-054013 A | 2/2001 |
| JP | 2001-238115 A | 8/2001 |
| JP | 2005-354486 A | 12/2005 |
| JP | 2006-042238 A | 2/2006 |

* cited by examiner

*Primary Examiner*—Kelly L Jerabek
(74) *Attorney, Agent, or Firm*—Lerner, David, Littenberg, Krumholz & Mentlik, LLP (57) ABSTRACT

An embodiment of the invention provides an image pick-up apparatus having a function of setting an exposure correction value, which may include a control portion and a display portion. The control portion may perform control for generating or acquiring reference images having a plurality of images having a plurality of different exposure correction values applied thereto. The display portion may display the reference images in accordance with the control made by the control portion. The control portion may execute processing for receiving as its input selection information selected by a user for the reference images displayed on the display portion, and setting the exposure correction value corresponding to the reference image selected by the user as an exposure correction value to be applied to a photographed image.

15 Claims, 7 Drawing Sheets

IMAGE PICK-UP APPARATUS WITH EXPOSURE SETTING METHOD

CROSS-REFERENCE TO RELATED APPLICATION

This application claims priority from Japanese Patent Application No. JP 2006-057268 filed in the Japanese Patent Office on Mar. 3, 2006, the entire content of which is incorporated herein by reference.

BACKGROUND OF THE INVENTION

1. Field of the Invention

The present invention relates to an image pick-up apparatus, an exposure controlling method, and a computer program, and more particularly to an image pick-up apparatus which is capable of setting a suitable exposure correction value, an exposure controlling method, and a computer program.

2. Description of the Related Art

A recent digital camera can take a photograph of an image of a subject even in various environments with proper exposure by using an automatic exposure correcting function. That is to say, the recent digital camera has a construction with which brightness is automatically detected, proper exposure is determined in accordance with the detected information, and an image of a subject is photographed with the exposure thus determined, thereby enabling the image of the subject suitable for the current brightness to be photographed.

However, the suitable exposure correction may not be performed with the automatic exposure according function under all the environments. That is to say, the brightness measured with the digital camera may not correspond to the brightness of the objective subject depending on a relationship between the objective subject and a light radiation direction. In such a case, the image photographed based on the automatic exposure correction may be different from an image which a user intends to obtain. In addition, the user wants to adjust the exposure in accordance with his/her taste without using the automatic exposure correcting function in some cases.

Many digital cameras have a function of adjusting the exposure with the automatic exposure correcting function being released by a manual manipulation made by the user. When the user manually corrects the exposure, in many digital cameras, for example, auxiliary information is presented to a display portion of the digital camera, and the user manipulates a manipulation portion based on the auxiliary information, thereby adjusting the exposure of the digital camera. With regard to the auxiliary information presented to the user, for example, there are histogram display on luminance data, and the like. The user adjusts an exposure correction value (EV value) in accordance with his/her experience and intuition while referring to the auxiliary information, and under this condition, takes a photograph of an image of a subject.

The exposure adjustment is generally carried out as processing for setting the exposure correction value (EV value). For example, the EV value is set which is determined to be suitable from the set range, for the exposure correction value (EV value), of −2.0 EV to 2.0 EV. The user who has experienced the exposure adjustment can readily determine the EV value which should be set in correspondence to the brightness of the photographed environment. However, the general user does not know what degrees of the brightness the EV values are suitable for in many cases. In such cases, the user may not properly carry out the processing for setting the exposure correction value (EV value) suitable for an image of which he/she wants to photograph.

That is to say, there is encountered a problem such that it is difficult for the user who has inexperienced the photographing that the camera is adjusted by himself/herself to carry out the optimal exposure adjustment. For example, even when the histogram on the luminance data is displayed on the display portion of the camera, the user does not understand how to read the displayed data, and also does not understand how to exposure correction is carried out. In addition, when the information, on a numeric value, typified by "an exposure value (EV value) is +2.0" is merely shown, the user may be difficult to image what image will be photographed based on this set value gets.

As a result, when many users utilizing their digital cameras intend to set manually the exposure correction value with the automatic exposure correcting function being released, they may not suitably set the exposure. Thus, there is encountered a problem such that they may not take a photograph of an image of a subject as they wish.

In addition, they fear a failure in photographing based on the manual adjustment, and thus hesitate to manually set the exposure correction value. Thus, there is also caused a problem such that as a result of taking a photograph of an image by using the automatic exposure correcting function, many users may not take a photograph of the image to their satisfaction.

SUMMARY OF THE INVENTION

In the light of the foregoing, it is therefore desirable to provide an image pick-up apparatus, an exposure controlling method, and a computer program which is capable of suitably setting an exposure correction value by a user.

According to an embodiment of the present invention, an image pick-up apparatus having a function of setting an exposure correction value may include a control portion and a display portion. The control portion may perform control for generating or acquiring reference images having a plurality of images having a plurality of different exposure correction values applied thereto. The display portion may display the reference images in accordance with the control made by the control portion.

The control portion may execute processing for receiving as its input selection information selected by a user for the reference images displayed on the display portion, and setting the exposure correction value corresponding to the reference image selected by the user as an exposure correction value to be applied to a photographed image.

Preferably, the control portion performs control for instructing a digital signal processing portion for executing image processing having the exposure correction value applied to the photographed image to execute processing for generating images having a plurality of different exposure correction values applied thereto based on the photographed image. The control portion may also perform control for instructing the display portion to display the images to which the plurality of different exposure correction values generated in the digital signal processing portion are applied as the reference images.

Preferably, the control portion performs control for generating images having a plurality of different exposure correction values applied thereto in a pseudo manner based on an image, having a single exposure correction value applied thereto, generated in the digital signal processing portion for executing image processing having the exposure correction values applied to the photographed image. The control portion may also perform control for instructing the display portion to display the images thus generated as the reference images.

Preferably, the image pick-up apparatus further includes a memory portion for storing a plurality of images having a plurality of different exposure correction values applied thereto. The control portion may perform control for acquiring a plurality of images to which the plurality of different exposure correction values stored in the memory portion are applied, and instructing the display portion to display the plurality of images thus acquired as the reference images.

Preferably, the image pick-up apparatus further includes a memory portion for storing image sets having a plurality of images having the plurality of different exposure correction values applied thereto in a form of a plurality set of images corresponding to a plurality of different luminance conditions. The control portion may perform control for receiving luminance information in a photographing environment of the image pick-up apparatus as an input. The image set corresponding to the luminance condition close to the luminance information thus received may be acquired from the memory portion. The display portion may be instructed to display the image set thus acquired in a form of the reference images.

Preferably, the control portion performs mode switching in accordance with manipulation information from the user, performs control for instructing the display portion to display a monitor image in a photographing mode, and instructing to display the reference images in an exposure correction value setting mode.

Preferably, the control portion performs control for instructing the display portion to display the monitor image and the reference images together.

According to another embodiment of the present invention, an exposure controlling method is for use in an image pick-up apparatus having a function of setting an exposure correction value. The method may include the step of performing control, in a control portion, for generating or performing reference images having a plurality of images having a plurality of different exposure correction values applied thereto, and instructing a display portion to display the reference images thus generated or acquired. The method may also include the steps of executing processing, in the control portion, for receiving as an input selection information from a user for the reference images displayed on the display portion, and setting the exposure correction value corresponding to the reference image selected by the user in a form of the exposure correction value to be applied to a photographed image.

Preferably, the reference image displaying step performs control for instructing a digital signal processing portion for executing image processing having the exposure correction values applied to a photographed image to execute processing for generating images having a plurality of different exposure correction values applied thereto based on the photographed image. The display portion may be instructed to display the images to which the plurality of different exposure correction values generated in the digital signal processing portion are applied in a form of the reference images.

Preferably, the reference image displaying step performs control for generating images having a plurality of different exposure correction values applied thereto in a pseudo manner based on an image, having a single exposure correction value applied thereto, generated in the digital signal processing portion for executing image processing having the exposure correction values applied to a photographed image. The display portion may be instructed to display the images thus generated in a form of the reference images.

Preferably, the image pick-up apparatus further includes a memory portion for storing data on a plurality of images having a plurality of different exposure correction values applied thereto. The reference image displaying step may perform control for acquiring a plurality of images to which the plurality of different exposure correction values stored in the memory portion are applied. The display portion may be instructed to display the plurality of images thus acquired in a form of the reference images.

Preferably, the image pick-up apparatus further includes a memory portion for storing image sets having a plurality of images having the plurality of different exposure correction values applied thereto in a form of a plurality set of images corresponding to a plurality of different luminance conditions. The reference image displaying step may perform control for receiving luminance information in a photographing environment of the image pick-up apparatus as an input. The image set corresponding to a luminance condition close to the luminance information thus received may be acquired from the memory portion, and the display portion may be instructed to display thereon the image set thus acquired in a form of the reference images.

Preferably, the exposure controlling method further includes the step of performing mode switching in accordance with manipulation information from the user in the control portion, and performing control, in the control portion, for instructing the display portion to display a monitor image in a photographing mode, and instructing to display the reference images in an exposure correction value setting mode.

Preferably, the exposure controlling method further includes the step of performing control, in the control portion, for instructing the display portion to display the monitor image and the reference images together.

According to still another embodiment of the present invention, a computer program is for executing exposure controlling processing in an image pick-up apparatus having a function of setting an exposure correction value. The computer program may include the steps of performing control, in a control portion, for generating or acquiring reference images having a plurality of images having a plurality of different exposure correction values applied thereto, and instructing a display portion to display the reference images thus generated or acquired. The computer program may also include the steps of executing processing, in the control portion, for receiving as an input selection information from a user for the reference images displayed on the display portion, and setting the exposure correction value corresponding to the reference image selected by the user in a form of the exposure correction value to be applied to a photographed image.

Note that, the computer program according to the still another embodiment of the present invention is one which, for example, can be provided in the form of a computer readable form to a general purpose computer system capable of executing various program codes through a storage medium or a communication medium, for example. The examples of the storage medium are a CD, an FD, and an MO. The example of the communication medium is a network. Such a computer program is provided in the form of the computer readable form, which results in processing corresponding to a program being realized on a computer system.

Other features and advantages of the present invention will be made clear from a more detailed description based on the preferred embodiments of the present invention which will be described later, and the accompanying drawings. Note that, the system described in this specification may mean a logical set construction of a plurality of apparatuses, and may not be limited to one in which apparatuses having respective constructions are accommodated in same chassis.

According to a constitution of the embodiment of the present invention, when the user executes the processing for setting the exposure correction value, the display portion may display the images to be processed having the various different exposure correction values applied thereto in the form of the reference images. Also, the user may select the image which he/she likes from the reference images, which results in that the exposure correction value corresponding to the image thus selected by the user is set as the exposure correction value to be applied to the photographed image. According to this constitution, the user can exactly execute the processing for setting the exposure correction value (EV value) based on the reference images displayed on the display portion. Also, even when the user does not grasp the meaning of the EV value, it is possible to photograph and record the image for which the suitable exposure correction processing which the user desires is executed.

DETAILED DESCRIPTION

Details of an image pick-up apparatus, an exposure controlling method, and a computer program according to embodiments of the present invention will be described hereinafter with reference to the accompanying drawings.

Figure 1:
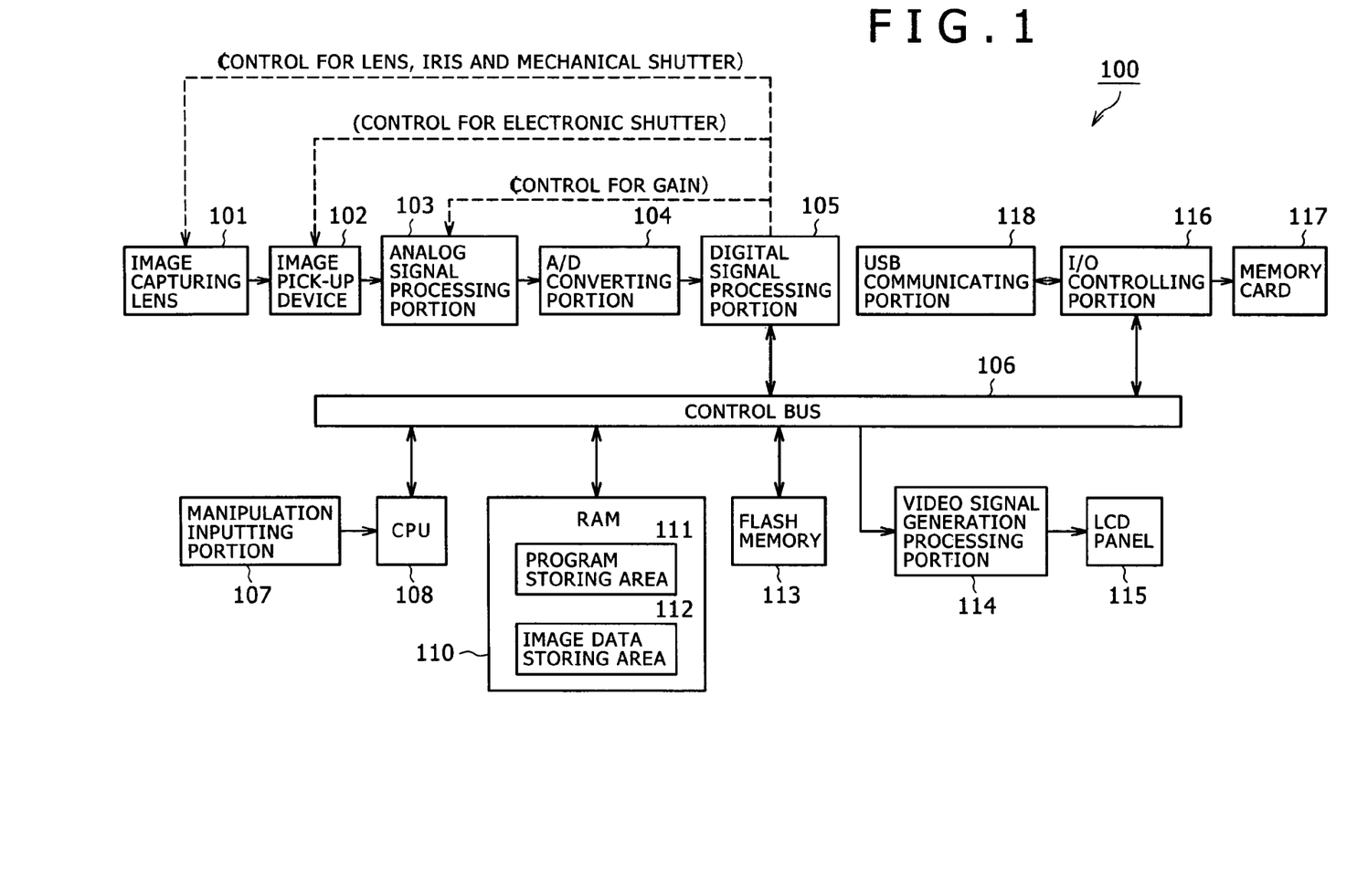
FIG. 1 is a block diagram explaining a configuration of an image pick-up apparatus according to an embodiment of the present invention.

Firstly, an example of a configuration of an image pick-up apparatus according to an embodiment of the present invention will now be described in detail with reference to FIG. 1. FIG. 1 is a block diagram showing a hardware configuration of the image pick-up apparatus according to the embodiment of the present invention. In the image pick-up apparatus 100 shown in FIG. 1, a light which has been made incident thereto through an image capturing lens 101 is applied to an image pick-up device (CCD) 102.

Note that, in a phase of photographing of an image of a subject, the image capturing lens 101 is controlled in accordance with control made by a digital signal processing portion 105. That is to say, the light on the image of the subject is made incident to the image capturing lens 101 in accordance with focusing control, mechanical shutter control, iris control, and the like made by the digital signal processing portion 105 and is then inputted to the image pick-up device (CCD) 102.

The image pick-up device (CCD) 102 generates a photoelectric conversion signal from the light signal inputted thereto. Also, the image pick-up device (CCD) 102 supplies an electrical signal to an analog signal processing portion 103 in accordance with an electronic shutter control signal as a control signal sent from the digital signal processing portion 105. Here, the light, on the image (image information) of the subject, thus inputted to the image pick-up device (CCD) 102 is converted into the electrical signal through the photoelectric conversion made by the image pick-up device (CCD) 102.

The analog signal processing portion 103 executes analog signal processing for the image information of the electrical signal supplied from the image pick-up device (CCD) 102. For example, the analog signal processing portion 103 holds a satisfactory S/N ratio by executing correlated double sampling (CDS) processing. Also, the analog signal processing portion 103 executes automatic gain control (AGC) processing in accordance with a gain control signal inputted thereto as a control signal sent from the digital signal processing portion 105. The signal processed by the analog signal processing portion 103 is inputted to an analog-to-digital (A/D) converting portion 104 and is converted into digital data through the A/D conversion.

The image data which has been made to turn into the digital signal is supplied to the digital signal processing portion (DSP) 105. The digital signal processing portion (DSP) 105 executes signal processing for the digital data supplied thereto, for example, executes camera signal processing such as auto focus (AF), auto exposure (AE), and auto white balance (AWB). Note that, the digital signal processing (DSP) portion 105 controls the image capturing lens 101, the image pick-up device 102, and the analog signal processing portion 103 in accordance with various camera control signals generated thereby.

The digital image data for which the various adjustments have been performed in the digital signal processing (DSP) portion 105 is compressed in accordance with a predetermined compression system. The resulting compressed data is then supplied to a memory card 117 as a recording medium through a control bus 106 and an I/O controlling portion 116 and is recorded in the memory card 117 in the form of a file. Alternatively, the resulting compressed data is outputted to an external apparatus through a UBS communicating portion 118.

Note that, the image pick-up apparatus 100 shown in FIG. 1 has an automatic exposure correcting function and a manual exposure correction value setting function. Thus, a user can execute photographing processing by selecting one of the automatic exposure correcting function and the manual exposure correction value setting function. When the user executes the processing to which the manual exposure correction value setting function is applied is executed, setting information which has been inputted to the image pick-up apparatus 100 through a manipulation inputting portion 107 is inputted to the digital signal processing portion 105 through a CPU 108 acting as a control portion, and a control bus 106. Then, the digital signal processing portion 105 executes exposure correction in accordance with the setting information thus inputted thereto, and generates necessary control signals which are in turn outputted to the image capturing lens 101, the image pick-up device 102, and the analog signal processing portion 103, respectively. Under this condition, the digital signal processing (DSP) portion 105 performs the control therefor.

The CPU 108 acting as the control portion executes the necessary processing in accordance with a program stored in a flash memory 113, that is, a program which is developed on a program storing area 111 of a RAM 110 in a phase of execution of the necessary processing. Note that, the RAM 110 has an image data storing area 112 in which data on an image such as an image, for example, generated based on the photographed image, or a set of sample images is stored. Here, the set of sample images is displayed on an LCD panel 115 as a display portion in the phase of execution of the exposure correction processing. The flash memory 113 stores therein various kinds of programs which are executed in the CPU 108, data, parameters, data on a set of sample images, and the like which are necessary for the processing in a non-volatile manner. The programs, the sample image data, and the like which are stored in the flash memory 113 are developed on the RAM 110 as may be necessary, and are applied to the processing to be executed in the CPU 108.

The LCD panel 115 acting as the display portion is utilized as a monitor image displaying screen for the photographed image. Moreover, in the phase of execution of the exposure correction setting processing executed by the user, the reference images which are presented to the user, or the like are displayed on the LCD panel 115. The video signal generation processing portion 114 generates an image to be displayed on the LCD panel 115 in accordance with the control made by the CPU 108.

In the image pick-up apparatus 100 according to this embodiment of the present invention, when the user executes the exposure correction value setting processing, the reference images for setting of the exposure correction value are displayed on the LCD panel 115 under the control by the CPU 108 so that the exact exposure correction value setting can be carried out. Then, the user can perform the exact exposure correction value setting while looking at the reference images displayed on the LCD panel 115.

A description will be described in detail hereinafter with respect to three examples corresponding to kinds of reference images which are displayed on the LCD panel 115 in order that the user may perform the exact exposure correction value setting. Three kinds of reference images are displayed on the LCD panel 115 as follows:

(1) The result images which are obtained by executing actually the exposure correction processing for the input image captured through the image capturing lens 101 are displayed as the reference images.

(2) The images for which the CPU 108 executes the exposure correction processing in the pseudo manner by using the software in accordance with the corresponding program are displayed as the reference images.

(3) The previously prepared sample images with which the user can properly understand the results of the exposure correction are displayed as the reference images.

Firstly, a change in display on the LCD panel 115 by a user manipulation made in the image pick-up apparatus 100 according to this embodiment of the present invention will now be described with reference to FIG. 2. After that, examples of display processing for the reference images (1) to (3) described above will be described in due order. The change in display on the LCD panel 115 is common to the three kinds of display processing for the reference images (1) to (3) described above, and thus is as shown in FIG. 2.

Figure 2:
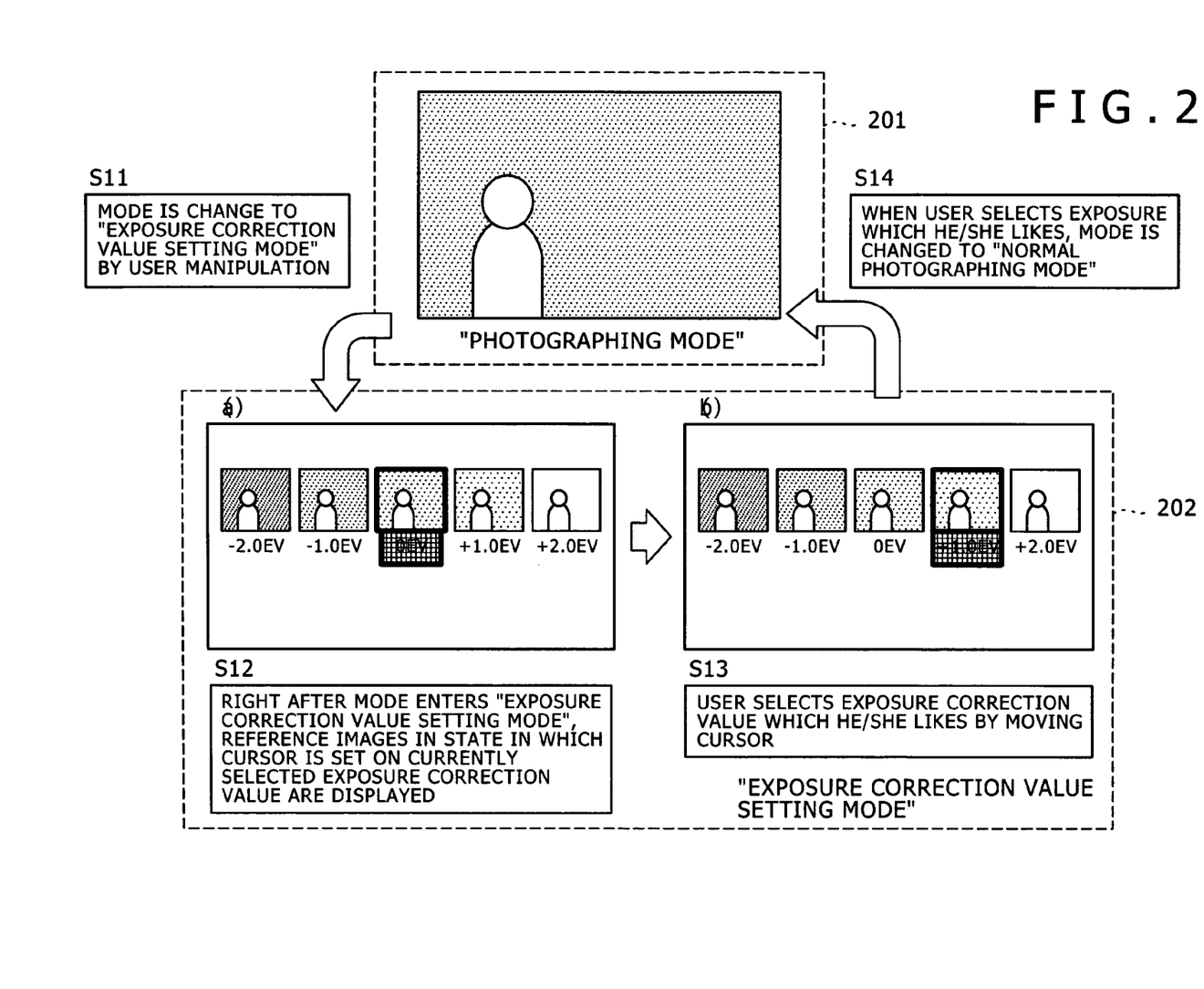
FIG. 2 is a diagram explaining a change in displayed data in a display portion accompanying a mode change in the image pick-up apparatus according to the embodiment of the present invention.

FIG. 2 shows display pictures of the LCD panel 115 in two modes. That is to say, FIG. 2 shows a photographing mode displaying picture 201 in a photographing mode, and an exposure correction value setting mode displaying picture 202 in an exposure correction value setting mode. Also, examples of display pictures (a) and (b) which are different from each other depending on a user manipulation are shown in the exposure correction value setting mode displaying picture 202.

The photographing mode displaying picture 201 shows a state in which an image itself photographed with the image pick-up apparatus is displayed as a monitor image on the LCD panel 115. In this state, in Step S11, the user manipulates the manipulation inputting portion 107, thereby performing mode change. Thus, when the exposure correction value setting mode is set, the display picture (a) of the exposure correction value setting mode displaying picture 202 shown in FIG. 2 is displayed on the LCD panel 115.

The display picture (a) of the exposure correction value setting mode displaying picture 202 corresponds to an image of a list of exposure correction image data (the EV values=−2.0 EV, −1.0 EV, 0 EV, +1.0 EV, and +2.0 EV in the example of FIG. 2) based on a plurality of different exposure correction values (EV values). Note that, a plurality of different exposure correction image data correspond to images which are different from one another in correspondence to the processing examples (1) to (3) described above:

(1) The result images which are obtained by executing actually the exposure correction processing for the input image captured through the image capturing lens 101 are displayed as the reference images.

(2) The images for which the CPU 108 executes the exposure correction processing in the pseudo manner by using the software in accordance with the corresponding program are displayed as the reference images.

(3) The previously prepared samples images with which the user can properly understand the results of the exposure correction are displayed as the reference images.

Concrete examples corresponding to the processing examples (1) to (3), respectively, will be described in a later paragraph.

As shown in Step S12, right after the mode has entered from "the photographing mode" into "the exposure correction value setting mode", the reference images in a state in which a cursor is set on the currently selected exposure correction value (0 EV in the example shown in FIG. 1) is displayed on the LCD panel 115.

The user moves the cursor to the exposure correction image data which is determined to be optimal for the photographing while referring to the display picture (a) of the exposure correction value setting mode displaying picture 202 by manipulating the manipulation inputting portion 107. That is to say, as shown in Step S13, the user selects the exposure correction value which he/she likes by moving the cursor. For example, when the EV value=+1.0 EV is determined to correspond to the image optimal for the photographing, as shown in the display picture (b) of the exposure correction value setting mode displaying picture 202, the cursor is moved to +1.0 EV.

After completion of this setting processing, in Step S14, the user performs the mode switching by manipulating the manipulation inputting portion 107. That is to say, the user executes the processing for switching the mode from "the exposure correction value setting mode" over to "the photographing mode".

In "the exposure correction value setting mode", the exposure correction value (the EV value=+1.0 EV in the example shown in FIG. 2) set by the user is inputted to the digital signal processing portion 105 in accordance with the control made by the CPU 108 as the control portion. Then, the digital signal processing portion 105 executes the exposure correction processing based on the exposure correction value (+1.0 EV) set by the user, generates the control signals necessary for the exposure correction based on the exposure correction value (+1.0 EV) set by the user, and outputs the resulting control signals to the image capturing lens 101, the image pick-up device 102, and the analog signal processing portion 103, respectively. In such a manner, the CPU 108 performs the control.

The details of examples of the reference image display processing about the three kinds of reference images to be displayed on the LCD panel 115 will be described in due order hereinafter in the form of processing examples 1 to 3 with reference to FIGS. 3, 4, and 5. Here, as described above, the three kinds of reference images are as follows:

(1) The result images which are obtained by executing actually the exposure correction processing for the input image captured through the image capturing lens 101 are displayed as the reference image.

(2) The images for which the CPU 108 executes the exposure correction processing in the pseudo manner by using the software in accordance with the corresponding program are displayed as the reference images.

(3) The previously prepared sample images with which the user can properly understand the results of the exposure correction are displayed as the reference images.

Moreover, a change of the processing example 3 will be described hereinafter in the form of a processing example 4.

PROCESSING EXAMPLE 1

Firstly, the processing example 1 will now be described with reference to FIG. 3. The processing example 1 is one in which a plurality of different exposure correction result images are displayed in the form of the reference images on the LCD panel 115. Here, the plurality of different exposure correction result images are obtained by executing the exposure correction processing based on the different exposure correction values for the input image captured through the image capturing lens 101 in the digital signal processing portion 105.

Figure 3:
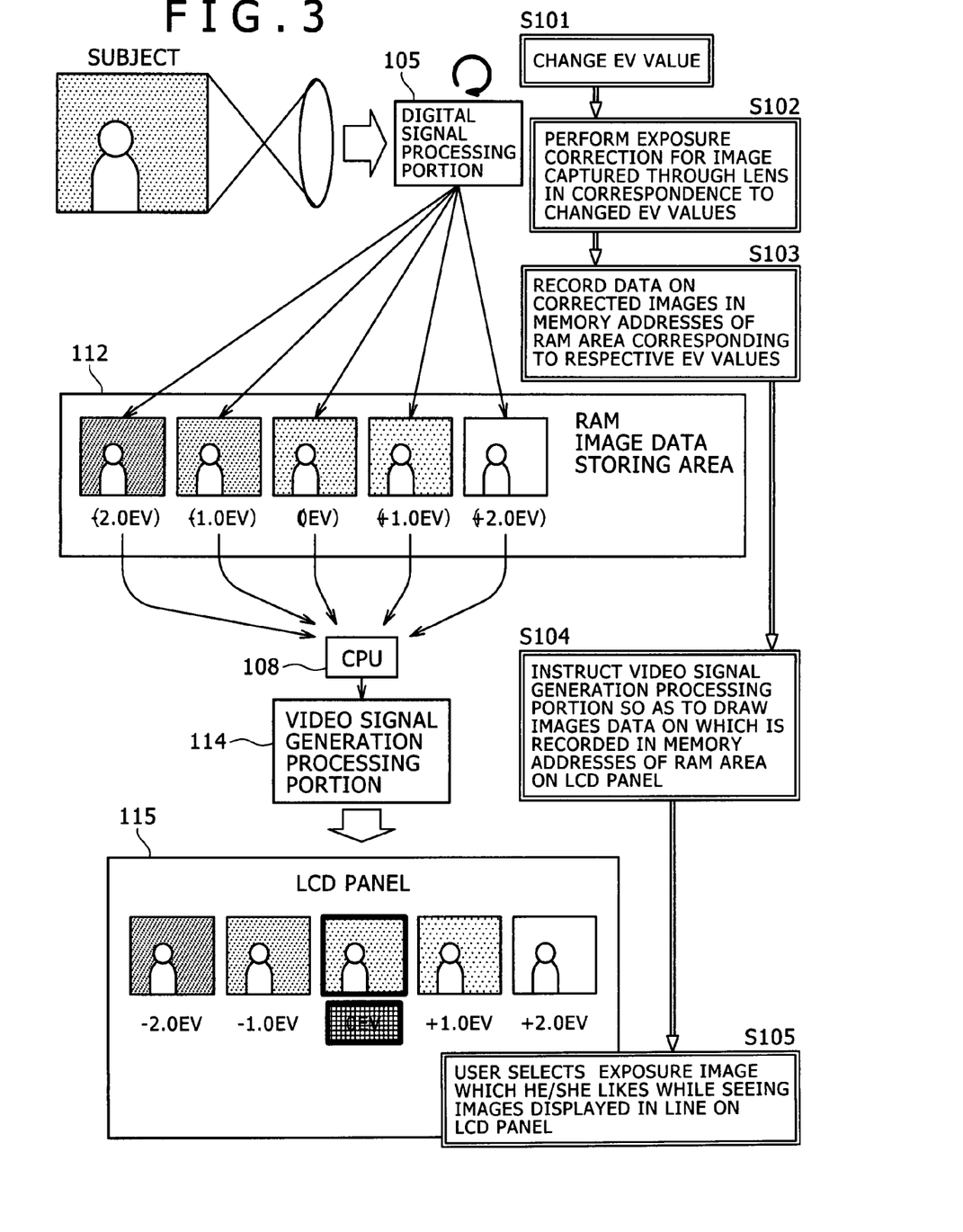
FIG. 3 is a diagram explaining an example of processing for setting an exposure correction value (processing example 1) in the image pick-up apparatus according to the embodiment of the present invention.

FIG. 3 shows an example of a processing sequence (Steps from S101 to S105) of this processing example 1, image data which is stored in the image data storing area 112 of the RAM 110 when the processing example 1 is carried out, and display data which is displayed on the LCD panel 115.

When this processing example 1 is carried out, firstly, the user switches the mode in the digital camera from "the photographing mode" to "the exposure correction value setting mode". That is to say, the processing which is previously described with reference to FIG. 2 is executed in Step S11. At this time, for the display data displayed on the LCD panel 115, the photographing mode displaying picture 201 shown in FIG. 2 is switched over to the exposure correction value setting mode displaying picture 202 shown in the display picture (a) of FIG. 2.

The CPU 108 starts to execute an exposure correction value setting processing program with the fact that "the photographing mode" is switched over to "the exposure correction value setting mode" as a trigger. Firstly, the CPU 108 ensures a memory area for the image data to be displayed on the LCD panel 115 as the image data storing area 112 of the RAM 110 in accordance with the exposure correction value setting processing program. In this processing example 1, the CPU 108 ensures the memory area necessary for displaying the image data on the list of the exposure correction image data (the EV values=−2.0 EV, −1.0 EV, 0 EV, +1.0 EV, and +2.0 EV) based on the five different exposure correction values (EV values). Note that, in this processing example 1, the displayed image is a thumbnail image. Thus, the memory area in which an amount of data necessary for displaying the thumbnail image can be recorded is ensured as the image data storing area 112 of the RAM 110.

Next, the CPU 108 reports the EV values (the EV values=−2.0 EV, −1.0 EV, 0 EV, +1.0 EV, and +2.0 EV in the processing example 1 shown in FIG. 3) and memory addresses corresponding to the image data storing area 112 ensured in the RAM 110 to the digital signal processing portion 105 in accordance with the exposure correction value setting processing program.

In Steps S101 and S102 shown in FIG. 3, the digital signal processing portion 105 successively makes the setting for the exposure correction for the photographed image in correspondence to the EV values reported from the CPU 108. Also, the digital signal processing portion 105 performs the exposure correction for the image inputted from the image pick-up device 102 in accordance with the individual set values. Moreover, in Step S103, the digital signal processing portion 105 records the data on the result images in the image data storing area 112, ensured in the RAM 110, which starts with the memory addresses reported from the CPU 108.

The digital signal processing portion 105 executes the processing from Steps S101 to S103 for all the EV values reported from the CPU 108. As a result, the digital signal processing portion 105 records the resulting image data in the image data storing area 112 ensured in the RAM 110. In the processing example 1 shown in FIG. 3, the image data (on the thumbnail image) which is generated through the application of the five different exposure correction values, that is, the EV values=−2.0 EV, −1.0 EV, 0 EV, +1.0 EV, and +2.0 EV is recorded in the image data storing area 112 ensured in the RAM 110.

Next, in Step S104, the CPU 108 issues an instruction, together with issue of the specification of the display coordinates, to the video signal generating processing portion 114 in order to draw the images the data, which is recorded in the image data storing area 112 of the RAM 110, on the LCD panel 115 in accordance with the corresponding program.

Then, the video signal generation processing portion 114 executes the processing for drawing the recorded image of the RAM 110 specified by the CPU 108 in the specified coordinates on the LCD panel 115. By executing this processing, as shown in FIG. 3, the images having a plurality of different exposure correction values set therein, that is, the images on the list of the EV values=−2.0 EV, −1.0 EV, 0 EV, +1.0 EV, and +2.0 EV in the processing example 1 shown in FIG. 3 are displayed on the LCD panel 115. Note that, during execution of the image list displaying processing, the images are displayed so that the user can grasp the exposure correction value before "the photographing mode" is switched over to "the exposure correction value setting mode". For example, as shown in FIG. 3, the display is performed in a state in which the cursor is set on the corresponding reference image (the cursor is set on the reference image corresponding to 0 EV in the processing example 1 shown in FIG. 3).

In Step S105, the user selects the image having the exposure set therefor which he/she likes in the form of the exposure set value which is set as the photographing condition while referring to the image list about the different exposure correction values (the EV values from −2.0 EV to +2.0 EV) displayed on the LCD panel 115. For example, the user moves the cursor and selects the image having the exposure set therefor which he/she likes. This process corresponds to the change from the display picture (a) to the display picture (b) of the exposure correction value setting mode displaying picture 202 which is previously described with reference to FIG. 2.

The CPU 108 determines the image selected by the user from cursor position information set by the user. Also, the CPU 108 reports the exposure correction value corresponding to the selected image to the digital signal processing portion 105.

The digital signal processing portion 105 sets the exposure correction value reported from the CPU 108 as the exposure correction value for the photographed image. Moreover, the CPU 108 releases the image data storing area 112 previously ensured in the RAM 110 and also switches the mode from "the exposure correction value setting mode" over to "the photographing mode" in accordance with the corresponding program. This processing is one in Step S14 which is previously described with reference to FIG. 2. By executing the mode switching processing, the display picture on the LCD panel 115 is switched over to the monitor display picture of the photographed image.

In the manner described above, in this processing example 1, a plurality of different exposure correction images are displayed in the form of the reference images on the LCD panel 115. Here, the digital signal processing portion 105 executes the exposure correction processing by actually applying the different exposure correction values (EV values) to the input image captured through the image capturing lens 101, thereby obtaining the plurality of different exposure correction images. Therefore, the user selects the image which he/she likes based on the reference images displayed on the LCD panel 115. As a result, the EV value corresponding to the image which the user likes is selected by the user, and is set in the form of the EV value to be applied to the exposure correction for the photographed image. Consequently, even when the user may not grasp the meaning of the EV value, it is possible to acquire the photographed image for which the suitable exposure correction processing has been executed which the user desires.

PROCESSING EXAMPLE 2

Next, the processing example 2 will now be described with reference to FIG. 4. The processing example 2 in which the images for which the CPU 108 executes the exposure correction processing in the pseudo manner by using the software in accordance with the exposure correction value setting processing program are displayed in the form of the reference images on the LCD panel 115. That is to say, in this processing example 2, a plurality of exposure-corrected images are not generated in the digital signal processing portion 105 through the application of the plurality of different exposure correction values, but the different exposure-corrected images are generated in the pseudo manner by the software through the processing executed by the CPU 108. Also, the resulting different exposure-corrected images are displayed on the LCD panel 115. This method, for example, can be implemented with the configuration of the image pick-up apparatus 100 shown in FIG. 1. That is to say, the images to be displayed are generated on the CPU 108 side without applying a load to any of the portions in the preceding stage of the digital signal processing portion 105, that is, any of the image capturing lens 101, the image pick-up device 102, and the analog signal processing portion 103. Thus, this processing example 2 has an advantage that no processing load for the image capturing lens 101, the image pick-up device 102, and the analog signal processing portion 103 is generated.

Figure 4:
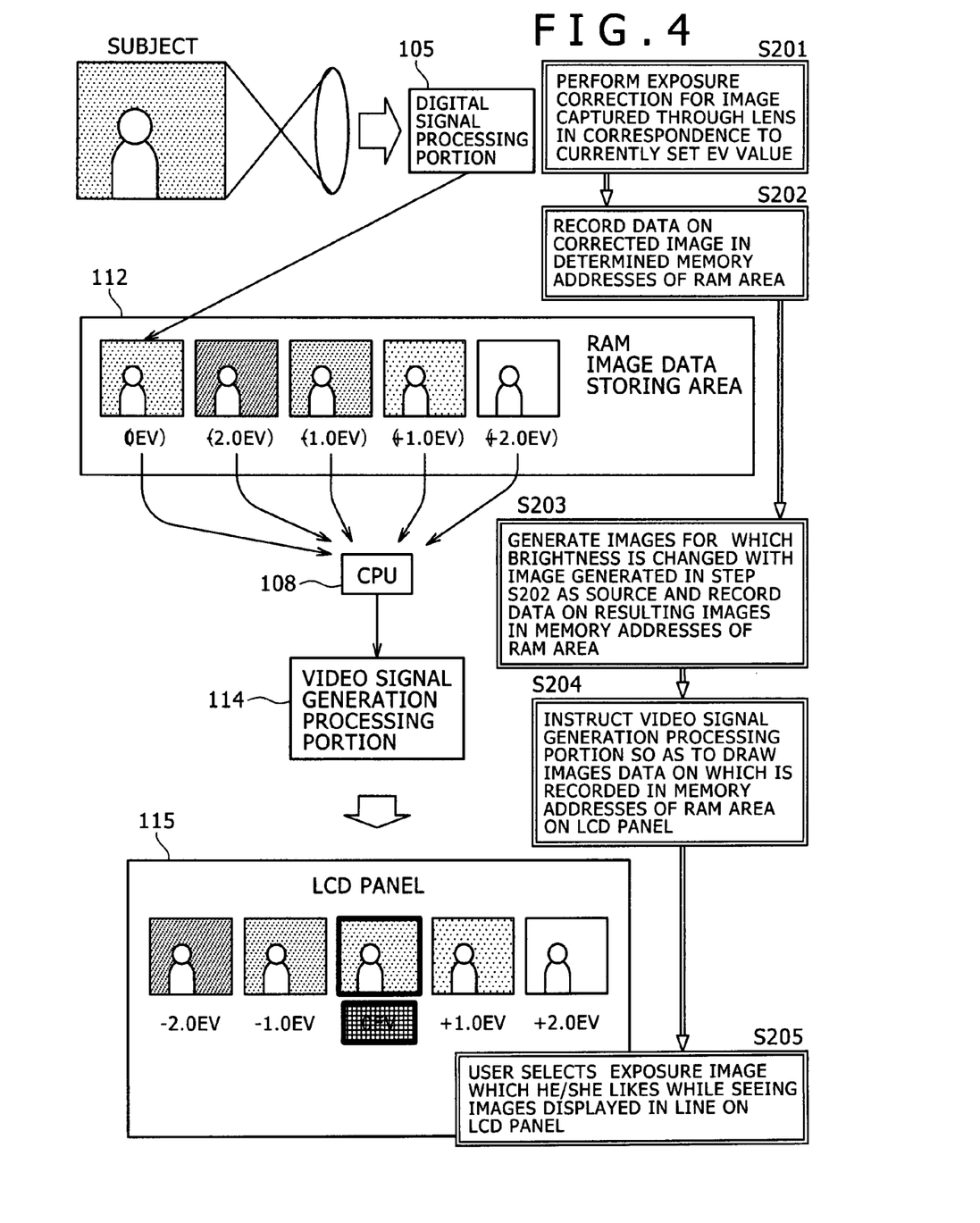
FIG. 4 is a diagram explaining an example of processing for setting an exposure correction value (processing example 2) in the image pick-up apparatus according to the embodiment of the present invention.

FIG. 4 shows an example of a processing sequence (Steps from S201 to S205) of the processing example 2, image data which is stored in the image data storing area 112 ensured in the RAM 110 when this processing example 2 is carried out, and display data which is displayed on the LCD panel 115.

When intending to carry out this processing example 2, firstly, the user switches the mode of the digital camera from "the photographing model" over to "the exposure correction value setting mode". That is to say, this processing corresponds to the processing in Step S11 which is previously described with reference to FIG. 2. At this time, for the display data which is displayed on the LCD panel 115, the photographing mode displaying picture 201 shown in FIG. 2 is switched over to the exposure correction value setting mode displaying picture 202 shown in the display picture (a) of FIG. 2.

The CPU 108 starts to execute the exposure correction value setting processing program with the fact that "the photographing mode" is switched over to "the exposure correction value setting mode" as a trigger. Firstly, the CPU 108 ensures the memory area for the data on the image which is displayed on the LCD panel 115 in the form of the image data storing area 112 of the RAM 110 in accordance with the exposure correction value setting processing program. In this processing example 2, the CPU 108 ensures the memory area necessary for displaying the image data on the list of the exposure correction image data (the EV values=−2.0 EV, −1.0 EV, 0 EV, +1.0 EV, and +2.0 EV) based on the five different exposure correction values (EV values). Note that, in this processing example 2, the displayed image is the thumbnail image. Thus, the memory area in which an amount of data necessary for displaying the thumbnail image can be recorded is ensured as the image data storing area 112 of the RAM 110.

In this processing example 2, the CPU 108 generates a plurality of different exposure correction value images based on one through image (corresponding to an image for monitoring the photographed image because it is displayed on the LCD panel 115) generated by the digital signal processing portion 105 in accordance with the exposure correction value setting processing program.

In the processing example 2 shown in FIG. 4, firstly, in Step S201, the digital signal processing portion 105 generates one through image (the image for monitoring the photographed image) in the form of the exposure-corrected image based on the EV value which has already been set on the basis of the photographing data captured through the image capturing lens 101. In the processing example 2 shown in FIG. 4, the digital signal processing portion 105 generates an image for which the exposure correction corresponding to the EV value=0 EV is performed. In Step S202, the data on the resulting image is recorded in the image data storing area 112 ensured in the RAM 110.

Next, in Step S203, the CPU 108 acquires the image data concerned (corresponding to 0 EV) from the RAM 110. Also, the CPU 108 generates exposure-corrected images to which a plurality of different exposure correction values (the EV values=−2.0 EV, −1.0 EV, 0 EV, +1.0 EV, and +2.0 EV) and which are displayed in the form of the reference images on the LCD panel 115 are applied based on the image data thus acquired. That is to say, the different exposure-corrected images are generated in the pseudo manner by using the software through the processing executed by the CPU 108 based on one image. The data on the different exposure-corrected images which have been generated in the pseudo manner by using the software through the processing executed by the CPU 108 is recorded in the image data storing area 112 secured in the RAM 110.

Next, in Step S204, the CPU 108 issues an instruction, together with issue of the specification of the display coordinates, to the video signal generating processing portion 114 in order to draw the images the data, which is recorded in the image data storing area 112 ensured in the RAM 110, on the LCD panel 105 in accordance with the exposure correction value setting processing program.

Then, the video signal generating processing portion 114 executes the processing for drawing the recorded image in the RAM 110 specified by the CPU 108, in the specified coordinates on the LCD panel 115. By executing this processing, as shown in FIG. 4, the images having a plurality of different exposure correction values set therein, that is, the images on the list of the EV values=−2.0 EV, −1.0 EV, 0 EV, +1.0 EV, and +2.0 EV in the processing example 2 shown in FIG. 4 are displayed on the LCD panel 115. Note that, during execution of the image list displaying processing, the images are displayed so that the user can grasp the exposure correction value before "the photographing mode" is switched over to "the exposure correction value setting mode". For example, as shown in FIG. 4, the display is performed in a state in which the cursor is set on the corresponding reference image (the cursor is set on the reference image corresponding to 0 EV in the processing example 2 shown in FIG. 4).

In Step S205, the user selects the image having the exposure set therefor which he/she likes in the form of the exposure set value which is set as the photographing condition while referring to the image list about the different exposure correction values (the EV values from −2.0 EV to +2.0 EV) displayed on the LCD panel 115. For example, the user moves the cursor and selects the image having the exposure set therefor which he/she likes. This process corresponds to the change from the display picture (a) to the display picture (b) of the exposure correction value setting mode displaying picture 202 which is previously described with reference to FIG. 2.

The CPU 108 determines the image selected by the user from cursor position information set by the user. Also, the CPU 108 reports the exposure correction value corresponding to the selected image to the digital signal processing portion 105.

The digital signal processing portion 105 sets the exposure correction value reported from the CPU 108 as the exposure correction value for the photographed image. Moreover, the CPU 108 releases the image data storing area 112 previously ensured in the RAM 110 and also switches the mode from "the exposure correction value setting mode" over to "the photographing mode" in accordance with the corresponding program. This processing is one in Step S14 which is previously described with reference to FIG. 2. By executing the mode switching processing, the display picture on the LCD panel 115 is switched over to the monitor display picture of the photographed image.

In the manner described above, in this processing example 2, the digital signal processing portion 105, and the image capturing lens 101, the image pick-up device 102, and the analog signal processing portion 103 in the preceding stage of the digital signal processing portion 105 execute the same processing as that in the normal photographing mode. Also, the CPU 108 generates the pseudo exposure-corrected images based on one photographed-image data, and the resulting pseudo exposure-corrected images are displayed in the form of the reference images on the LCD panel 115. Therefore, no excessive processing is generated in any of the image capturing lens 101, the image pick-up device 102, and the analog signal processing portion 103, and thus it is possible to efficiently present the reference images at a high speed.

The user selects the image which he/she likes based on the reference images displayed on the LCD panel 115, which results in that the EV value corresponding to the image which the user likes is selected and is set as the EV value which is applied to the exposure correction for the photographed image. Therefore, even when the user may not grasp the meaning of the EV value, it is possible to acquire the photographed image for which the suitable exposure correction processing has been executed which the user desires.

PROCESSING EXAMPLE 3

Next, a processing example 3 will now be described in detail with reference to FIG. 5. The processing example 3 is one in which sample images with which the user can properly understand results of the exposure correction are displayed in the form of the reference images on the LCD panel 115. Here, the results of the exposure correction are previously recorded in the flash memory 113 of the image pick-up apparatus 100 shown in FIG. 1. That is to say, in this processing example 3, neither of the digital signal processing portion 105 and the CPU 108 generates the image to be displayed, but the sample images as the processing images are presented. Here, a plurality of different exposure correction values which are previously prepared are applied to the sample images. In this processing example 3, the processing for generating a plurality of exposure-corrected images is unnecessary, and thus no image generating processing load is applied to each of the processing portions. As a result, this processing example 3 has an advantage that the reference images can be displayed on the LCD panel 115 at a high speed.

Figure 5:
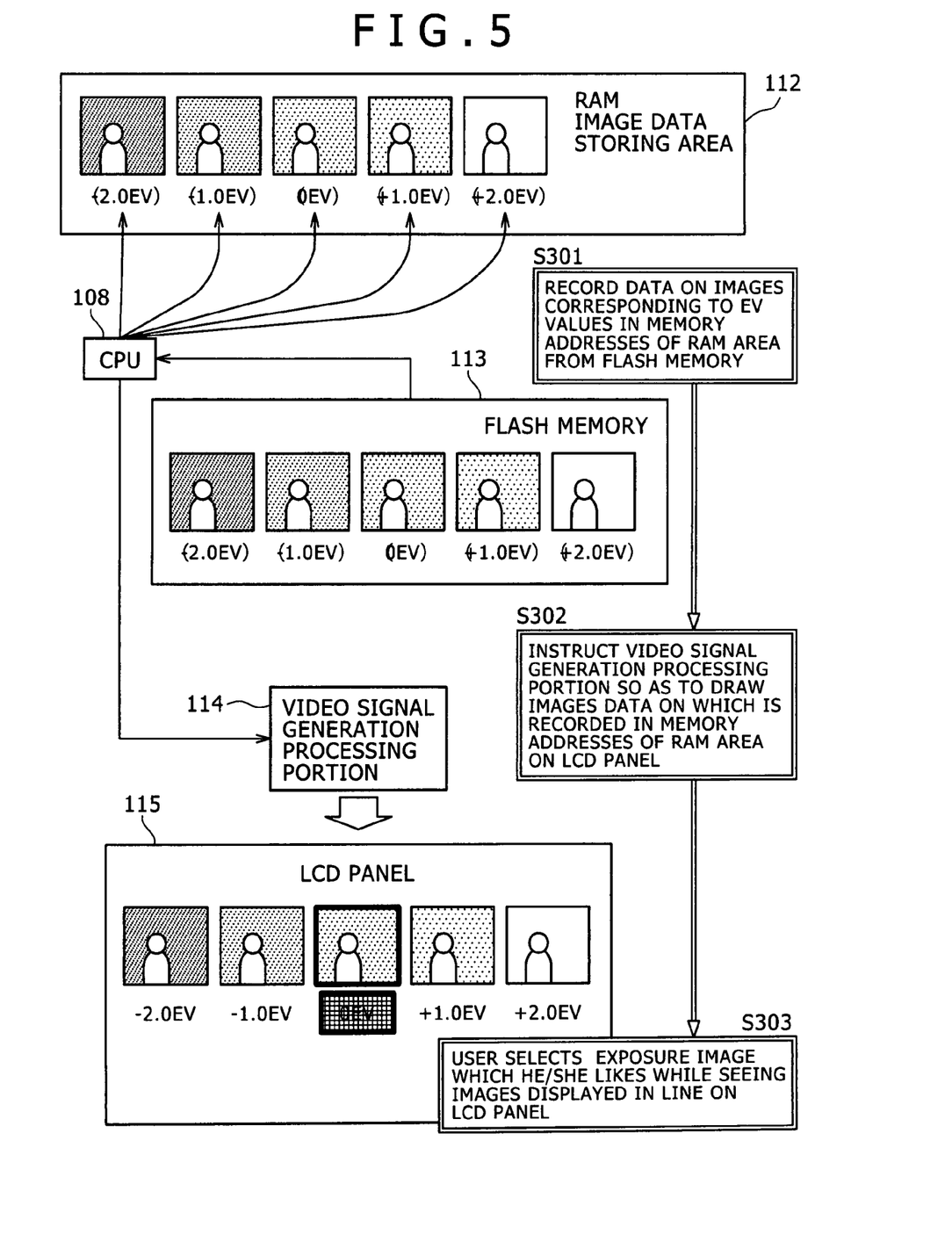
FIG. 5 is a diagram explaining an example of processing for setting an exposure correction value (processing example 3) in the image pick-up apparatus according to the embodiment of the present invention.

FIG. 5 shows an example of a processing sequence (Steps from S301 to S303) of this processing example 3, image data which is stored in the image storing area 112 ensured in the RAM 110 when this processing example 3 is carried out, sample image data which is stored in the flash memory 113, and display data which is displayed on the LCD panel 115.

When intending to carry out this processing example 3, firstly, the user switches the mode of the digital camera from "the photographing mode" over to "the exposure correction value setting mode". That is to say, this processing corresponds to the processing in Step S11 which is previously described with reference to FIG. 2. At this time, for the display data which is displayed on the LCD panel 115, the photographing mode displaying picture 201 shown in FIG. 2 is switched over to the exposure correction value setting mode displaying picture 202 shown in the display picture (a) of FIG. 2.

The CPU 108 starts to execute the exposure correction value setting processing program with the fact that "the photographing mode" is switched over to "the exposure correction value setting mode" as a trigger. Firstly, the CPU 108 ensures the memory area for the data on the image which is displayed on the LCD panel 115 in the form of the image data storing area 112 of the RAM 110 in accordance with the exposure correction value setting processing program. In this processing example 3, the CPU 108 ensures the memory area necessary for displaying the image data on the list of the exposure-corrected image data (the EV values=−2.0 EV, −1.0 EV, 0 EV, +1.0 EV, and +2.0 EV) based on the five different exposure correction values (EV values). Note that, in this processing example 3, the displayed image is the thumbnail image. Thus, the memory area in which an amount of data necessary for displaying the data on the thumbnail image can be recorded is ensured as the image data storing area 112 of the RAM 110.

In this processing example 3, in Step S301 shown in FIG. 5, the CPU 108 acquires the sample images as the exposure-corrected images to which the five different exposure correction values previously stored in the flash memory 113 are applied. Then, the CPU 108 records the data on the sample images thus acquired in the image data storing area 112 secured in the RAM 110. In this processing example 3, the data on the exposure-corrected images to which a plurality of different exposure correction values (the EV values=−2.0 EV, −1.0 EV, 0 EV, +1.0 EV, and +2.0 EV) are applied is stored in the flash memory 113. The CPU 108 acquires the data on these five different images from the flash memory 113 and records the data on these five different images in the image data storing area 112 secured in the RAM 110.

Next, in Step S302, the CPU 108 issues an instruction, together with issue of the specification of the display coordinates, to the video signal generating processing portion 114 in order to draw the recorded images, which is recorded in the image data storing area 112 of the RAM 110, on the LCD panel 105 in accordance with the corresponding program.

Then, the video signal generation processing portion 114 executes the processing for drawing the image the recorded data in the RAM 110 specified by the CPU 108 in the specified coordinates on the LCD panel 115. By executing this processing, as shown in FIG. 5, the sample images having a plurality of different exposure correction values set therein, that is, the images on the list of the EV values=−2.0 EV, −1.0 EV, 0 EV, +1.0 EV, and +2.0 EV in the processing example 3 shown in FIG. 5 are displayed on the LCD panel 115. Note that, during execution of the image list displaying processing, the images are displayed so that the user can grasp the exposure correction value before "the photographing mode" is switched over to "the exposure correction value setting mode". For example, as shown in FIG. 5, the display is performed in a state in which the cursor is set on the corresponding reference image (the cursor is set on the reference image corresponding to 0 EV in the processing example 3 shown in FIG. 5).

In Step S303, the user selects the image having the exposure set therefor which he/she likes in the form of the exposure set value which is set as the photographing condition while referring to the image list about the different exposure correction values (EV values from −2.0 EV to +2.0 EV) displayed on the LCD panel 115. For example, the user moves the cursor and selects the image having the exposure set therefor which he/she likes. This process corresponds to the change from the display picture (a) to the display picture (b) of the exposure correction value setting mode displaying picture 202 which is previously described with reference to FIG. 2.

The CPU 108 determines the image selected by the user from cursor position information set by the user in accordance with the corresponding program. Also, the CPU 108 reports the exposure correction value corresponding to the selected image to the digital signal processing portion 105.

The digital signal processing portion 105 sets the exposure correction value reported from the CPU 108 as the exposure correction value for the photographed image. Moreover, the CPU 108 releases the image data storing area 112 previously ensured in the RAM 110 and also switches the mode from "the exposure correction value setting mode" over to "the photographing mode" in accordance with the corresponding program. This processing is one in Step S14 which is previously described with reference to FIG. 2. By executing the mode switching processing, the display picture on the LCD panel 115 is switched over to the monitor display picture of the photographed image.

In the manner described above, in this processing sample 3, unlike any of the processing examples 1 and 2 which are previously described, the sample images which are previously stored in the flash memory 113 are acquired and are displayed on the LCD panel 115 without executing the processing for generating the exposure-corrected images in the digital signal processing portion 105 and the CPU 108 at all. As a result, the processing loads in the processing portions are reduced, and thus the reference images can be efficiently presented at a high speed.

The user selects the image which he/she likes based on the reference images displayed on the LCD panel 115, which results in that the EV value corresponding to the image which the user likes is selected and is set as the EV value which is applied to the exposure correction for the photographed image. Therefore, even when the user may not grasp the meaning of the EV value, it is possible to acquire the photographed image for which the suitable exposure correction processing has been executed which the user desires.

PROCESSING EXAMPLE 4

Change of Processing Example 3

Next, a change of the above-mentioned processing example 3 will now be described in detail as a processing example 4 with reference to FIG. 6. Similarly to the processing example 3, the processing example 4 is one in which sample images with which the user can properly understand results of the exposure correction are displayed in the form of the reference images on the LCD panel 115. Here, the results of the exposure correction are previously recorded in the flash memory 113 of the image pick-up apparatus 100 shown in FIG. 1. In the processing example 3 which has been described with reference to FIG. 5, the data on a set of sample images is stored in the flash memory 113. Also, the CPU 108 executes the processing for displaying the set of sample images on the LCD panel 15. However, in this processing example 4, data on a plurality set of different sample images are stored in the flash memory 113 and the CPU 108 executes processing for selecting the sample images to be displayed on the LCD panel 115 in correspondence to the situation (the brightness in the phase of the photographing).

That is to say, in consideration of the photographing under the various luminance conditions, the data on the sample images for which the exposure correction is performed under the various luminance conditions is previously stored in the flash memory 113. For example, as shown in FIG. 6, the data on a plurality set of sample images (a), (b), (c), . . . are stored in the flash memory 113. In this processing example 4, each of the plurality set of sample images (a), (b), (c), . . . constitutes the image data on the list of the exposure correction image data (the EV values=−2.0 EV, −1.0 EV, 0 EV, +1.0 EV, and +2.0 EV) based on the five different exposure correction values (EV values). However, these five different image samples are ones for which the setting is made so that the luminances in the respective phases of the photographing are different from one another.

Figure 6:
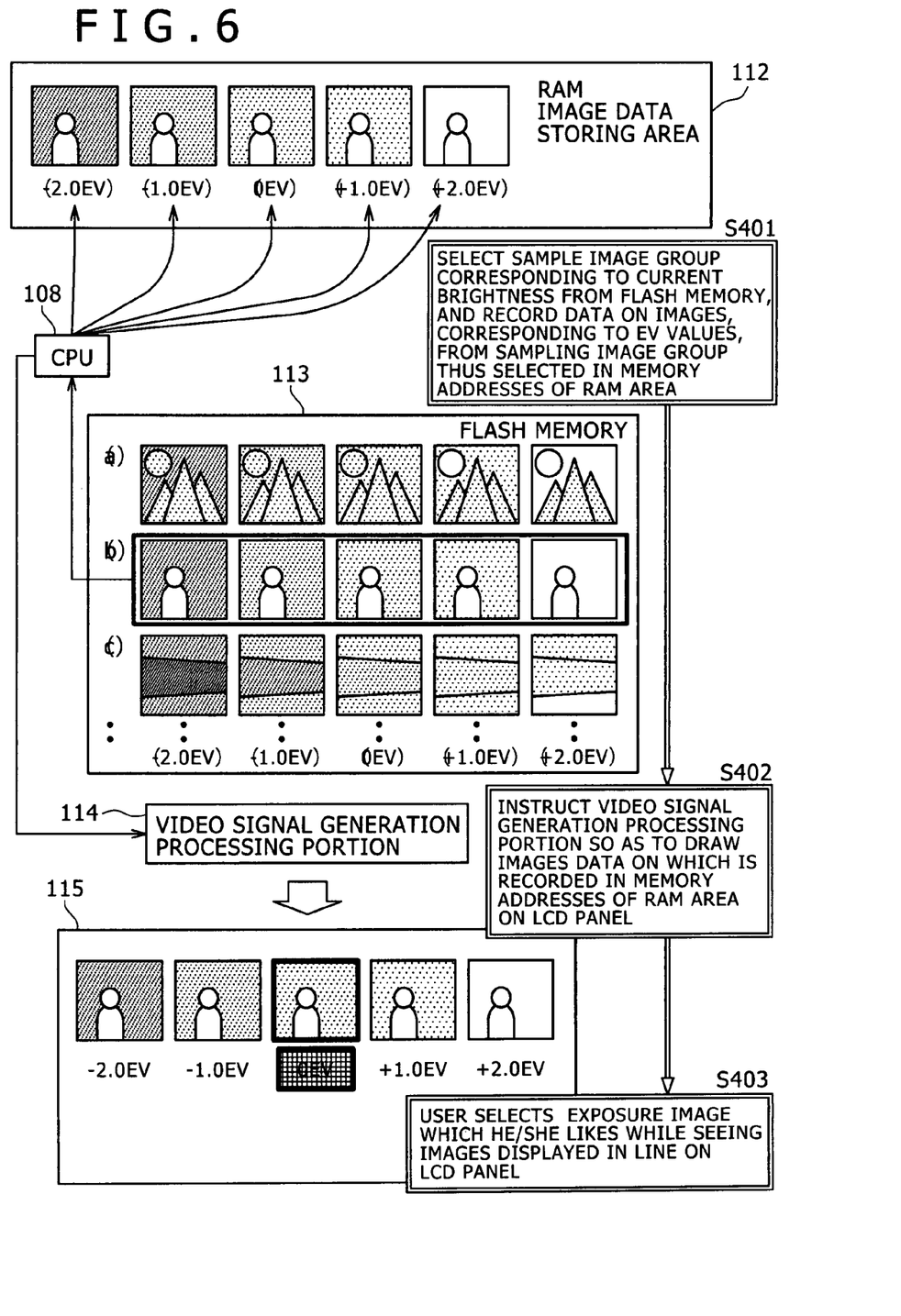
FIG. 6 is a diagram explaining an example of processing for setting an exposure correction value (processing example 4) in the image pick-up apparatus according to the embodiment of the present invention.

For example, the five different images in a set of sample images (a) stored in the flash memory 113 shown in FIG. 6 are ones each of which is photographed in a low luminance state. The data on a set of sample images (a) is obtained from the exposure-corrected image data (the EV values=−2.0 EV, −1.0 EV, 0 EV, +1.0 EV, and +2.0 EV) which is generated by applying the five different exposure correction values (EV values) to the photographed image in a low luminance state. In addition, the data on a set of sample images (b) is obtained from the exposure correction image data which is generated by applying the five different exposure correction values (EV values) to the photographed images in a middle luminance state. Also, the data on a set of sample images (c) is obtained from the exposure-corrected image data which is generated by applying the five different exposure correction values (EV values) to the photographed image in a high luminance state.

The digital camera detects luminance information as photographing state information. The CPU 108 receives as its input the luminance information thus detected, and selects the sample image having the luminance condition nearest the current brightness from the sample images stored in the flash memory 113. Then, the sample image thus selected is displayed on the LCD panel 115.

In this processing example 4 as well, similarly to the processing example 3, neither of the digital signal processing portion 105 and the CPU 108 generates the image to be displayed, but the sample images as the processing images are presented. Here, a plurality of different exposure correction values which are previously prepared are applied to the processing images. In this processing example 4 as well, similarly to the processing example 3, since the processing for generating a plurality of exposure-corrected images is unnecessary, and no image generating processing load is applied to each of the processing portions, this processing example 4 has an advantage that the reference images can be displayed on the LCD panel 115 at a high speed. In addition, the exposure-corrected image data based on the photographing data under the condition corresponding to the current brightness is presented on the LCD panel 115. Hence, the user can look at the precise exposure-corrected sample image corresponding to the image which he/she intends to photograph from now on as the reference image.

FIG. 6 shows an example of a processing sequence (Steps from S401 to S403) of this processing example 4, image data which is stored in the image storing area 112 ensured in the RAM 110 when this processing example 4 is carried out, and display data which is displayed on the LCD panel 115.

When intending to carry out this processing example 4, firstly, the user switches the mode of the digital camera from "the photographing mode" over to "the exposure correction value setting mode". That is to say, this processing corresponds to the processing in Step S11 which is previously described with reference to FIG. 2. At this time, for the display data which is displayed on the LCD panel 115, the photographing mode displaying picture 201 shown in FIG. 2 is switched over to the exposure correction value setting mode displaying picture 202 shown in the display picture (a) of FIG. 2.

The CPU 108 starts to execute the exposure correction value setting processing program with the fact that "the photographing mode" is switched over to "the exposure correction value setting mode" as a trigger. Firstly, the CPU 108 ensures the memory area for the data on the image which is displayed on the LCD panel 115 in the form of the image data storing area 112 of the RAM 110 in accordance with the exposure correction value setting processing program. In this processing example 4, the CPU 108 ensures the memory area necessary for displaying the image data on the list of the exposure correction image data (the EV values=−2.0 EV, −1.0 EV, 0 EV, +1.0 EV, and +2.0 EV) based on the five different exposure correction values (EV values). Note that, in this processing example 4, the displayed image is the thumbnail image. Thus, the memory area in which an amount of data necessary for displaying the thumbnail image can be recorded is ensured as the image data storing area 112 of the RAM 110.

In this processing example 4, in Step S401 shown in FIG. 6, the CPU 108 receives as its input the current luminance information, and selects a set of sample images having the luminance condition nearest the current luminance (brightness) thus inputted thereto from a plurality of sample images stored in the flash memory 113 in accordance with the exposure correction value setting processing program. Also, the CPU 108 records the data on the set of sample image thus selected in the image data storing area 112 secured in the RAM 11 in accordance with the exposure correction value setting processing program. In this processing example 4, the data on a plurality set of sample images (a), (b), (c), ... which were photographed under the different luminance conditions, respectively, is stored in the flash memory 113. Moreover, each of the plurality of sample images is constituted by the exposure-corrected images to which a plurality of different exposure correction values (the EV values=−2.0 EV, −1.0 EV, 0 EV, +1.0 EV, and +2.0 EV) are applied.

The CPU 108 selects and acquires a set of five sample images having the luminance condition nearest the current luminance (brightness) from the plurality set of sample images stored in the flash memory 113, and records the data on the set of five sample images thus acquired in the image data storing area 112 secured in the RAM 110.

Next, in Step S402, the CPU 108 issues an instruction, together with issue of the specification of the display coordinates, to the video signal generating processing portion 114 in order to draw the images, which is recorded in the image data storing area 112 of the RAM 110, on the LCD panel 105 in accordance with the corresponding program.

Then, the video signal generation processing portion 114 executes the processing for drawing the recorded image in the RAM 110 specified by the CPU 108 in the specified coordinates on the LCD panel 115. By executing this processing, as shown in FIG. 6, the images having a plurality of different exposure correction values set therefor, that is, the images on the list of the EV values=−2.0 EV, −1.0 EV, 0 EV, +1.0 EV, and +2.0 EV in the processing example 4 shown in FIG. 6 is displayed on the LCD panel 115. Note that, during execution of the image list displaying processing, the images are displayed so that the user can grasp the exposure correction value before "the photographing mode" is switched over to "the exposure correction value setting mode". For example, as shown in FIG. 6, the display is performed in a state in which the cursor is set on the corresponding reference image (the cursor is set on the reference image corresponding to 0 EV in the processing example 4 shown in FIG. 6).

In Step S403, the user selects the image having the exposure set therefor which he/she likes in the form of the exposure set value which is set as the photographing condition while referring to the image list about the different exposure correction values (the EV values from −2.0 EV to +2.0 EV) displayed on the LCD panel 115. For example, the user moves the cursor and selects the image having the exposure set therefor which he/she likes. This process corresponds to the change from the display picture (a) to the display picture (b) of the exposure correction value setting mode display picture 202 which is previously described with reference to FIG. 2.

The CPU 108 determines the image selected by the user from cursor position information set by the user in accordance with the corresponding program. Also, the CPU 108 reports the exposure correction value corresponding to the selected image to the digital signal processing portion 105.

The digital signal processing portion 105 sets the exposure correction value reported from the CPU 108 as the exposure correction value for the photographed image. Moreover, the CPU 108 releases the image data storing area 112 previously ensured in the RAM 110 and also switches the mode from "the exposure correction value setting mode" over to "the photographing mode" in accordance with the corresponding program. This processing is one in Step S14 which is previously described with reference to FIG. 2. By executing the mode switching processing, the display picture on the LCD panel 115 is switched over to the monitor display picture of the photographed image.

In the manner described above, in this processing example 4, similarly to the processing example 3 which is previously described, the sample images previously stored in the flash memory 113 are acquired and are displayed on the LCD panel 115 without executing the processing for generating the exposure-corrected images in the digital signal processing portion 105 and the CPU 108 at all. AS a result, the processing loads in the respective processing portions are reduced, and thus it is possible to efficiently present the reference images at a high speed. Moreover, in this processing example 4, the exposure-corrected image data based on the photographing data under the condition corresponding to the current brightness is presented on the LCD panel 115. Hence, the user can look at the precise exposure-corrected sample image corresponding to the image which he/she intends to photograph from now on as the reference image.

The user selects the image which he/she likes based on the reference images displayed on the LCD panel 115, which results in that the EV value corresponding to the image which the user likes is selected and is set as the EV value which is applied to the exposure correction for the photographed image. Therefore, even when the user may not grasp the meaning of the EV value, it is possible to acquire the photographed image for which the suitable exposure correction processing has been executed which the user desires.

[Display Example for Display Portion]

In each of the above-mentioned processing examples 1 to 4, the description has been given with respect to the constitution in which there is executed the processing for switching the display data in accordance with the change in display state of the LCD panel 115, the switching processing being described previously with reference to FIG. 2. That is to say, as described with reference to FIG. 2, in the photographing mode, the photographing mode displaying picture 201 shown in FIG. 2 is displayed, and the image itself being photographed is displayed as the monitor image on the LCD panel 115. In this state, in Step S11, the user manipulates the manipulation inputting portion 107, which results in that the mode is changed to be set to the exposure correction value setting mode. Hereupon, the display picture (a) of the exposure correction value setting mode displaying picture 202 is displayed on the LCD panel 115, and a plurality of different exposure-corrected image data are displayed in the form of the reference images, respectively.

Alternatively, the processing constitution may be adopted in which the monitor image and the reference images are displayed together without switching the monitor image and the reference images over to each other. A description will now be given with respect to an example of the processing constitution in which the monitor image and the reference images are displayed together with reference to FIG. 7.

Figure 7:
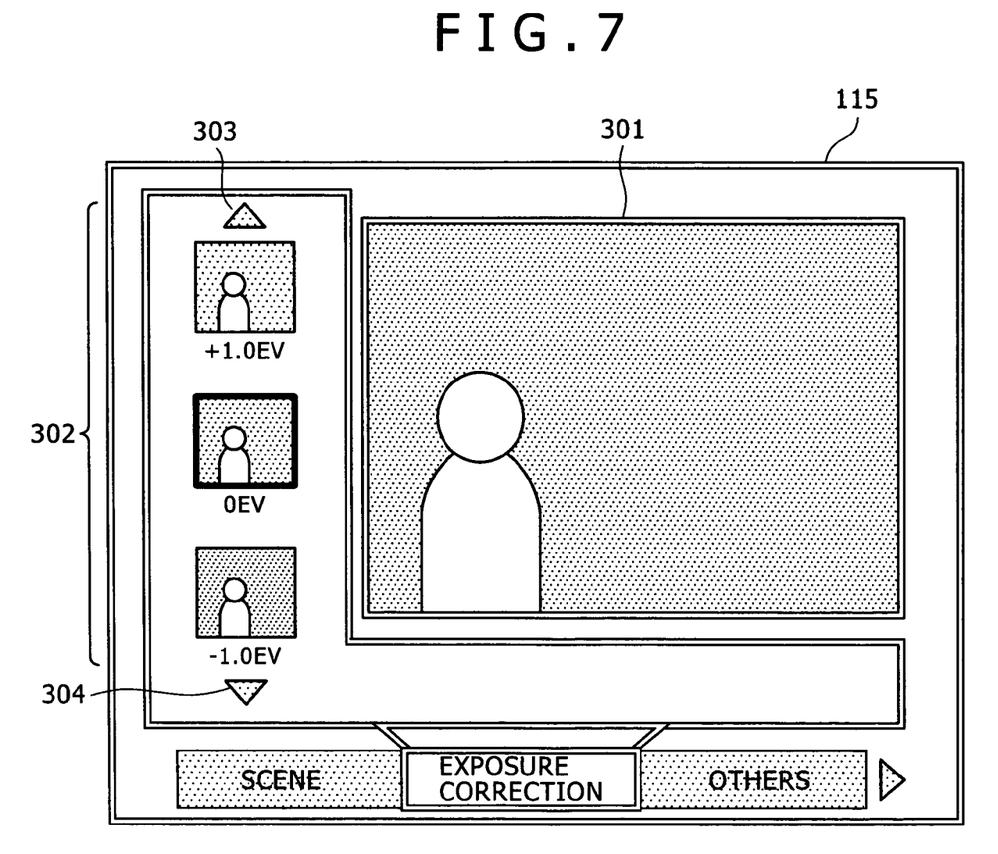
FIG. 7 is a diagram explaining an example of displayed data structure in the display portion in the image pick-up apparatus according to the embodiment of the present invention.

FIG. 7 shows an example of a display picture displayed on the LCD panel 115. A display picture on the LCD panel 115 is partitioned into a monitor image displaying area 301 and a reference image displaying area 302. Thus, the monitor image being currently photographed is displayed on the monitor image displaying area 301, and the reference images corresponding to any one of the above-mentioned processing examples 1 to 4 are displayed on the reference image displaying area 302.

The three reference images to which the three different exposure correction values (EV values) are applied, respectively, are displayed on the reference image displaying area 302 shown in FIG. 7. This display example adopts the setting in which the user manipulates slide switches 303 and 304, so that the different exposure-corrected images are displayed on the reference image displaying area 302 while being vertically slid. Note that, a setting may also be adopted in which all the reference images are displayed on the reference image displaying area 302 in correspondence to a display space.

In the display example shown in FIG. 7, the monitor image and the reference images are displayed together on the LCD panel 115. Hence, the user can select the suitable exposure correction value (EV value) while comparing the monitor image and the reference images with each other.

An embodiment of the present invention has been described in detail with reference to the specific embodiment so far. However, it is obvious that those skilled in the art may make the modifications and substitutions of the embodiment without departing from the gist of the invention. That is to say, an embodiment of the present invention has been disclosed in the form of the exemplification, and should not be construed on a limiting sense. Therefore, in order to properly determine the gist of the invention, the appended claims should be taken into consideration.

In addition, a series of processing described in the specification can be executed by the hardware, the software, or the combined structure of both the hardware and the software. When being executed by using the software, the processing can be executed in accordance with a program recorded in a processing sequence and then installed in a memory within a computer incorporated in the dedicated hardware, or can be executed in accordance with a program installed in a general purpose computer which is capable of executing the various kinds of processing.

For example, a program can be previously recorded in hardware or a read only memory (ROM) as a recording medium. Alternatively, a program can be temporarily or permanently stored (recorded) in a removable recording medium such as a flexible disc, a compact disc read only memory (CD-ROM), a magneto optical (MO) disc, a digital versatile disc (DVD), a magnetic disc, or a semiconductor memory. Such a removable recording medium can be provided in the form of so-called package software.

Note that, the program is installed from the removable recording medium as described above in the computer. In addition thereto, the program is transferred in a wireless manner from a down load site to the computer, or is transferred in a wired manner to the computer through a network such as a local area network (LAN) or the Internet. Then, the computer can receive the program thus transmitted thereto in such a manner and can install the program concerned in the recording medium such as a hard disc built therein.

It should be noted that the various kinds of processing described in the specification may be not only executed in a time series manner in accordance with the description in the specification, but also executed in parallel or individually in correspondence to a throughput of an apparatus which executes such processing as may be necessary. In addition, the system stated in this specification means a logical set construction of a plurality of apparatuses, and thus is not limited to one in which the apparatuses having the respective constructions are accommodated in the same chassis.

As set forth hereinabove, according to the constitution of the embodiment of the present invention, when the user executes the processing for setting the exposure correction value, the processing images to which the various different exposure correction values are applied are displayed in the form of the reference images on the display portion. Also, the user selects the image which he/she likes from the reference images, which results in that the exposure correction value corresponding to the image thus selected is set in the form of the exposure correction value which is applied to the photographed image. According to this constitution, the user can execute the processing for exactly setting the exposure correction value (EV value) based on the reference images displayed on the display portion. As a result, even when the user may not grasp the meaning of the EV value, the image for which the suitable exposure correction processing which the user desires is executed can be photographed and recorded.

The invention claimed is:

1. An image pick-up apparatus having a function of setting an exposure correction value, comprising:
   a control portion for performing control for generating or acquiring reference images having a plurality of images having a plurality of different exposure correction values applied thereto; and
   a display portion for displaying the reference images in accordance with the control made by said control portion;
   wherein said control portion executes processing for receiving as its input selection information selected by a user for the reference images displayed on said display portion, and setting the exposure correction value corresponding to the reference image selected by the user as an exposure correction value to be applied to a photographed image,
   wherein the display portion is configured for displaying each of the reference images in displayed association with the exposure correction value corresponding to the displayed reference image, and
   a memory portion for storing image sets having a plurality of images having the plurality of different exposure correction values applied thereto in a form of a plurality set of images corresponding to a plurality of different luminance conditions,
   wherein said control portion performs control for receiving luminance information in a photographing environment of said image pick-up apparatus as an input, the image set corresponding to the luminance condition close to the luminance information thus received is acquired from said memory portion, and said display portion is instructed to display the image set thus acquired in a form of the reference images.

2. The image pick-up apparatus according to claim 1, wherein said control portion performs control for instructing a digital signal processing portion for executing image processing having the exposure correction value applied to the photographed image to execute processing for generating images having a plurality of different exposure correction values applied thereto based on the photographed image, and instructing said display portion to display the images to which the plurality of different exposure correction values generated in said digital signal processing portion are applied as the reference images.

3. The image pick-up apparatus according to claim 1, wherein said control portion performs control for generating images having a plurality of different exposure correction values applied thereto in a pseudo manner based on an image, having a single exposure correction value applied thereto, generated in said digital signal processing portion for executing image processing having the exposure correction values applied to the photographed image, and instructing said display portion to display the images thus generated as the reference images.

4. The image pick-up apparatus according to claim 1, further comprising
   a memory portion for storing a plurality of images having a plurality of different exposure correction values applied thereto,
   wherein said control portion performs control for acquiring a plurality of images to which the plurality of different exposure correction values stored in said memory portion are applied, and instructing said display portion to display the plurality of images thus acquired as the reference images.

5. The image pick-up apparatus according to claim 1, wherein said control portion performs mode switching in accordance with manipulation information from the user, performs control for instructing said display portion to display a monitor image in a photographing mode, and instructs to display the reference images in an exposure correction value setting mode.

6. The image pick-up apparatus according to claim 1, wherein said control portion performs control for instructing said display portion to display a monitor image and the reference images together.

7. An exposure controlling method for use in an image pick-up apparatus having a function of setting an exposure correction value, said method comprising the steps of:
   performing control, in a control portion, for generating or performing reference images having a plurality of images having a plurality of different exposure correction values applied thereto, and instructing a display portion to display the reference images thus generated or acquired; and
   executing processing, in said control portion, for receiving as an input selection information from a user for the reference images displayed on said display portion, and setting the exposure correction value corresponding to the reference image selected by the user in a form of the exposure correction value to be applied to a photographed image,
   wherein the instructing further includes instructing the display portion to display each of the reference images in a displayed association with the exposure correction value corresponding to the displayed reference image, and
   wherein the image pick-up apparatus further comprises:
   a memory portion for storing image sets having a plurality of images having the plurality of different exposure correction values applied thereto in a form of a plurality set of images corresponding to a plurality of different luminance conditions, and
   said reference image displaying step performs control for receiving luminance information in a photographing environment of said image pick-up apparatus as an input, the image set corresponding to a luminance condition close to the luminance information thus received is acquired from said memory portion, and said display portion is instructed to display the image set thus acquired in a form of the reference images.

8. The exposure controlling method according to claim 7, wherein said reference image displaying step performs control for instructing a digital signal processing portion for executing image processing having the exposure correction values applied to a photographed image to execute processing for generating images having a plurality of different exposure correction values applied thereto based on the photographed image, and said display portion is instructed to display the images to which the plurality of different exposure correction values generated in said digital signal processing portion are applied in a form of the reference images.

9. The exposure controlling method according to claim 7, wherein said reference image displaying step performs control for generating images having a plurality of different exposure correction values applied thereto in a pseudo manner based on an image, having a single exposure correction value applied thereto, generated in said digital signal processing portion for executing image processing having the exposure correction values applied to a photographed image, and said display portion is instructed to display the images thus generated in a form of the reference images.

10. The exposure controlling method according to claim 7, wherein said image pick-up apparatus further comprises:
   a memory portion for storing data on a plurality of images having a plurality of different exposure correction values applied thereto, and
   said reference image displaying step performs control for acquiring a plurality of images to which the plurality of different exposure correction values stored in said memory portion are applied, and said display portion is instructed to display the plurality of images thus acquired in a form of the reference images.

11. The exposure controlling method according to claim 7, further comprising:
   performing mode switching in accordance with manipulation information from the user in said control portion, and performing control, in said control portion, for instructing said display portion to display a monitor image in a photographing mode, and instructing to display the reference images in an exposure correction value setting mode.

12. The exposure controlling method according to claim 7, further comprising:
   performing control, in said control portion, for instructing said display portion to display the monitor image and the reference images together.

13. A computer readable medium with a stored computer program for executing exposure controlling processing in an image pick-up apparatus having a function of setting an exposure correction value, said computer program comprising:
   performing control, in a control portion, for generating or acquiring reference images having a plurality of images having a plurality of different exposure correction values applied thereto, and instructing a display portion to display the reference images thus generated or acquired; and
   executing processing, in said control portion, for receiving as an input selection information from a user for the reference images displayed on said display portion, and setting the exposure correction value corresponding to the reference image selected by the user in a form of the exposure correction value to be applied to a photographed image,
   wherein the instructing further includes instructing the display portion to display each of the reference images in a displayed association with the exposure correction value corresponding to the displayed reference image,
   wherein the control of the computer program further controls a memory portion for storing image sets having a plurality of images having the plurality of different exposure correction values applied thereto in a form of a plurality set of images corresponding to a plurality of different luminance conditions,
   wherein the control further performs control for receiving luminance information from a photographing environment of an image pick-up apparatus as an input, the image set corresponding to the luminance condition close to the luminance information thus received is acquired from said memory portion, and the display portion is instructed to display the image set thus acquired in a form of the reference images.

14. An image pick-up apparatus having a function of setting an exposure correction value, comprising:
   a control portion for performing control for generating or acquiring reference images having a plurality of images having a plurality of different exposure correction values applied thereto;
   a display portion for displaying the reference images in accordance with the control made by said control portion; and
   a memory portion for storing image sets having a plurality of images having the plurality of different exposure correction values applied thereto in a form of a plurality set of images corresponding to a plurality of different luminance conditions,
   wherein said control portion performs control for receiving luminance information in a photographing environment of said image pick-up apparatus as an input, the image set corresponding to the luminance condition close to the luminance information thus received is acquired from said memory portion, and said display portion is instructed to display the image set thus acquired in a form of the reference images, and
   wherein said control portion executes processing for receiving as its input selection information selected by a user for the reference images displayed on said display portion, and setting the exposure correction value corresponding to the reference image selected by the user as an exposure correction value to be applied to a photographed image.

15. An exposure controlling method for use in an image pick-up apparatus having a function of setting an exposure correction value, said method comprising the steps of:
   performing control, in a control portion, for generating or performing reference images having a plurality of images having a plurality of different exposure correction values applied thereto, and instructing a display portion to display the reference images thus generated or acquired; and
   executing processing, in said control portion, for receiving as an input selection information from a user for the reference images displayed on said display portion, and setting the exposure correction value corresponding to the reference image selected by the user in a form of the exposure correction value to be applied to a photographed image,
   wherein said image pick-up apparatus further comprises:
      a memory portion for storing image sets having a plurality of images having the plurality of different exposure correction values applied thereto in a form of a plurality set of images corresponding to a plurality of different luminance conditions, and
      said reference image displaying step performs control for receiving luminance information in a photographing environment of said image pick-up apparatus as an input, the image set corresponding to a luminance condition close to the luminance information thus received is acquired from said memory portion, and said display portion is instructed to display the image set thus acquired in a form of the reference images.

* * * * *